United States Patent
Hahn et al.

(10) Patent No.: US 11,529,026 B2
(45) Date of Patent: Dec. 20, 2022

(54) WALL-MOUNTABLE SANITARY CONDUIT CONNECTION DEVICE WITH INTEGRATED VALVE

(71) Applicant: Hansgrohe SE, Schiltach (DE)

(72) Inventors: Arno Hahn, Schiltach (DE); Fridolin Meier, Oberwolfach (DE); Bernd Werner, Oberndorf-Beffendorf (DE)

(73) Assignee: Hansgrohe SE, Schiltach (DE)

( * ) Notice: Subject to any disclaimer, the term of this patent is extended or adjusted under 35 U.S.C. 154(b) by 202 days.

(21) Appl. No.: 16/812,219

(22) Filed: Mar. 6, 2020

(65) Prior Publication Data
US 2020/0281418 A1 Sep. 10, 2020

(30) Foreign Application Priority Data

Mar. 8, 2019 (DE) ...................... 10 2019 203 218.4

(51) Int. Cl.
*A47K 5/12* (2006.01)
(52) U.S. Cl.
CPC ........ *A47K 5/1217* (2013.01); *A47K 2201/02* (2013.01)
(58) Field of Classification Search
CPC ........................ A47K 5/1217; A47K 2201/02; F16K 27/062; F16K 31/046; F16K 5/04;
(Continued)

(56) References Cited

U.S. PATENT DOCUMENTS

| | | |
|---|---|---|
| 4,989,633 A | 2/1991 | Humpert et al. |
| 5,934,032 A | 8/1999 | Oberdörfer |

(Continued)

FOREIGN PATENT DOCUMENTS

| | | |
|---|---|---|
| AT | 517356 A4 | 1/2017 |
| AU | 2003270936 A1 | 7/2004 |

(Continued)

OTHER PUBLICATIONS

Decision to Grant issued by the Federal Institute of Industrial Property (FIIP), Russia, dated Aug. 26, 2020, for Russian Patent Application No. 2020109767/10(016153), 13 pages (partial English language translation included, 4 pages).

(Continued)

*Primary Examiner* — Muhammad Ijaz
(74) *Attorney, Agent, or Firm* — Bose McKinney & Evans LLP

(57) ABSTRACT

A wall-mountable sanitary conduit connection device with integrated valve. More particularly, a wall-mountable sanitary conduit connection device includes a wall-mountable base body and a valve fastenable to the base body. The sanitary conduit connection device according to an illustrative embodiment includes a wall-mountable base body having a receiving sleeve and a water inlet duct which, with an inlet duct outflow, leads peripherally into the receiving sleeve, an electrically controllable valve having a cylindrical valve cartridge which is axially insertable into the receiving sleeve and in which a valve unit is located, which valve cartridge has an electrical valve connection unit on a first end face and a pipe connection coupling on a second end face and includes, on a peripheral side, a valve inlet opening which is capable of being coupled to the inlet duct outflow in a fluid-tight manner, and a fastening unit for fastening the valve cartridge in a fixed position in the receiving sleeve.

12 Claims, 6 Drawing Sheets

(58) Field of Classification Search
CPC .......... F16K 5/08; F16K 27/065; F16K 31/02; E03C 1/055; E03C 1/021; E03C 1/02
USPC ...................................................... 248/205.1
See application file for complete search history.

(56) References Cited

U.S. PATENT DOCUMENTS

| | | | |
|---|---|---|---|
| 5,947,147 | A | 9/1999 | Gnauert et al. |
| 6,047,722 | A | 4/2000 | Cordes et al. |
| 6,378,911 | B1 | 4/2002 | Grohe |
| 7,584,898 | B2* | 9/2009 | Schmitt .............. G05D 23/1393 236/12.12 |
| 8,403,297 | B2* | 3/2013 | Cen ...................... H01H 13/562 251/319 |
| 9,650,768 | B2 | 5/2017 | Johnson et al. |
| 10,138,619 | B2 | 11/2018 | Colombo |
| 10,663,075 | B2* | 5/2020 | Wang ....................... E03C 1/055 |
| 2004/0193326 | A1* | 9/2004 | Phillips ................. F16K 31/042 700/282 |
| 2009/0057591 | A1 | 3/2009 | Izzy et al. |
| 2011/0290356 | A1 | 12/2011 | Yang |
| 2013/0062422 | A1* | 3/2013 | Marty ..................... E03C 1/057 236/12.16 |
| 2013/0312856 | A1 | 11/2013 | Huffington |
| 2015/0308086 | A1* | 10/2015 | Feng ....................... E03C 1/042 4/678 |
| 2018/0044897 | A1 | 2/2018 | Blattner et al. |
| 2019/0338499 | A1 | 11/2019 | Philipps et al. |

FOREIGN PATENT DOCUMENTS

| | | |
|---|---|---|
| CN | 1773157 A | 5/2006 |
| CN | 101105245 A | 1/2008 |
| DE | 3907586 A1 | 9/1990 |
| DE | 9311444 U1 | 10/1993 |
| DE | 19622368 A1 | 12/1997 |
| DE | 19627571 A1 | 1/1998 |
| DE | 19702356 A1 | 7/1998 |
| DE | 10247066 A1 | 4/2004 |
| DE | 102004054642 A1 | 5/2006 |
| DE | 102004060744 A1 | 6/2006 |
| DE | 102014008570 A1 | 12/2015 |
| DE | 102016214777 A1 | 2/2018 |
| DE | 102017100707 A1 | 7/2018 |
| DE | 102017127151 A1 | 5/2019 |
| EP | 0844340 A1 | 5/1998 |
| EP | 2937476 A1 | 10/2015 |
| EP | 2889522 B1 | 7/2017 |
| RU | 2518469 C2 | 6/2014 |

OTHER PUBLICATIONS

European Search Report, dated Jul. 28, 2020, for European Patent Application No. 20161136.5-1002, 6 pages.
Office Action (in German language) issued by German Patent and Trademark Office, dated Mar. 10, 2020, for German Patent Application No. 10 2019 203 218.4; 6 pages.
First Office Action issued by the National Intellectual Property Administration, P.R. China, dated Sep. 14, 2021 for Chinese Patent Application No. 202010151822.5 (in Chinese language with English Translation), 17 pages.

* cited by examiner

WALL-MOUNTABLE SANITARY CONDUIT CONNECTION DEVICE WITH INTEGRATED VALVE

CROSS-REFERENCE TO RELATED APPLICATION

This application claims priority to German Patent Application No. DE 10 2019 203 218.4, filed on Mar. 8, 2019, the disclosure of which is expressly incorporated herein by reference.

BACKGROUND AND SUMMARY OF THE DISCLOSURE

The invention relates to a wall-mountable sanitary conduit connection device having a wall-mountable base body and a valve fastenable to the base body.

Conduit connection devices of this kind are used in sanitary engineering in particular as an interface between water supply installations on the building side, on the one hand, and end-user devices such as shower devices and sanitary outlet faucets or outlet fittings on washstands, bathtubs, kitchen sinks and the like, on the other hand. They are customary both in designs of the surface-mounted type and in designs of the concealed type, e.g. as so-called surface-mounted or concealed boxes, either of the type in question here with integrated valve or in embodiments without valve. Such conduit connection devices are often also used as so-called water plugs. Here, wall-mountable is to be understood as meaning that the sanitary conduit connection device is intended and designed to be able to be mounted on a building-side wall, especially on a wall region in which a building-side water installation connection point is present. The term wall is generally to be understood here as a building-side surface which is suitable for the mounting of the conduit connection device and which can be both an actual vertical wall surface of a building and also a ceiling surface or floor surface.

The following documents are cited as being representative of the prior art, primarily in respect of the concealed-type design: laid-open publications DE 10 2016 214 777 A1, DE 10 2017 100 707 A1, US 2011/0290356 A1, DE 10 2004 060 744 A1, DE 197 02 356 A1, DE 10 2004 054 642 A1, DE 196 22 368 A1, DE 196 27 571 A1, US 2009/0057591 A1, EP 0 844 340 A1 and DE 39 07 586 A1, and also patent specifications EP 2 889 522 B1, U.S. Pat. Nos. 9,650,768 B2 and 10,138,619.B2.

It is an object of an illustrative embodiment of the invention to provide a wall-mountable sanitary conduit connection device which is of the type mentioned at the outset and, in relation to the aforementioned prior art, affords improvements in respect of flexibility of use, compact design, manufacturing outlay and/or possible applications in modern sanitary systems, including systems with water plugs and systems for sanitary smart-home applications.

The illustrative embodiment of the invention achieves this and other objects by providing a wall-mountable sanitary conduit connection device which includes a wall-mountable base body having a receiving sleeve and a water inlet duct which, with an inlet duct outflow, leads peripherally into the receiving sleeve. The conduit connection device further comprises an electrically controllable valve having a cylindrical valve cartridge which is axially insertable into the receiving sleeve. A valve unit is located in the valve cartridge, and the valve cartridge has an electrical valve connection unit on a first end face and a pipe connection coupling on a second end face. The valve cartridge further comprises on a peripheral side a valve inlet opening which is capable of being coupled to the inlet duct outflow of the water inlet duct in a fluid-tight manner. The conduit connection device comprises a fastening unit with which the valve cartridge can be fastened in a fixed position in the receiving sleeve.

By virtue of this design, the conduit connection device can be used flexibly for various applications, specifically also in modern sanitary devices of the smart home type or in sanitary systems with water plugs. By the use of the electrically controllable valve, the water flow in the conduit connection device can be electrically controlled, which in particular permits remote control of the water flow, such that direct accessibility to the conduit connection device for the purpose of actuating the valve is not absolutely necessary. The valve can in particular be a shut-off valve, alternatively a valve of another type, such as a mixing valve or switching valve, for which purpose the valve can then accordingly have one or more additional valve inlet openings and/or valve outlet openings.

Through the use of a valve with a cylindrical valve cartridge insertable into the receiving sleeve of the base body, the conduit connection device can be equipped flexibly, according to requirements, with a respectively desired valve, which is then inserted with its valve cartridge into the receiving sleeve. The fastening unit ensures that the valve cartridge is fastened in a fixed position in the receiving sleeve and thus ensures, according to requirements, a desired mechanical strength of the connection of valve and base body.

Also of advantage is the configuration of the valve cartridge with the electrical valve connection unit on one end face and with the pipe connection coupling on the other end face, and with the valve inlet opening formed on the periphery. The pipe connection coupling on the second end face of the valve cartridge here forms an outlet opening of the valve to which it is possible to couple in a desired manner a pipe that leads in particular to a sanitary end user, such as a shower device or a water outlet fitting, e.g. in the form of conventional mixer fittings or outlet faucets. The word pipe is to be understood here as meaning rigid water-carrying pipes and also flexible water-carrying hose lines, e.g. a rigid pipe connection piece, which leads to a shower body or shower head, or a flexible shower hose that leads to a shower head. If required, the fixed fastening of the valve cartridge in the receiving sleeve by the fastening unit can be provided with a sufficiently high mechanical load-bearing capacity of the kind needed for a direct coupling of a shower head or shower arm provided with a connection piece, for example for a ceiling-mounted overhead shower or a wall-mounted overhead shower or side shower in a shower room.

In an illustrative development of the invention, the fastening unit has a bayonet connection unit with a bayonet connection flange protruding radially on the peripheral side of the valve cartridge and with, on the receiving sleeve, a bayonet connection shoulder engageable from behind by the bayonet connection flange of the valve cartridge. This constitutes a very advantageous configuration of the fastening unit. After it has been pushed axially into the receiving sleeve, the valve cartridge can in this way be fastened securely in the receiving sleeve by a bayonet rotation movement. Since the bayonet connection is in principle releasable, the valve cartridge can if necessary be removed again from the receiving sleeve, e.g. for the purpose of cleaning or for replacement by another valve cartridge.

In one illustrative embodiment of the invention, the fastening unit has a bayonet lock for the bayonet connection unit. The bayonet lock has an axial partial peripheral bore on each of the inner circumference of the receiving sleeve and the outer circumference of the valve cartridge, and an anti-rotation bolt. An axial partial peripheral bore is to be understood here as meaning that it forms circumferentially only one part of a complete axially extending bore, i.e. extends with its bore edge by less than 360°. The two partial peripheral bores are adapted in shape to each other in such a way that it is only in a fastening position of the bayonet connection unit, in which the bayonet connection unit fastens the valve cartridge in a fixed position in the receiving sleeve, that they align with each other in order to form a full bore, i.e. a full bore in the circumferential direction, into which the anti-rotation bolt is insertable. Thus, with the anti-rotation bolt inserted, the valve cartridge is secured or locked, in its bayonet connection rotation position, against inadvertent turning back to the bayonet release direction.

In one illustrative embodiment of the invention, the valve cartridge has a sealing ring which annularly surrounds the valve inlet opening and which, in the cartridge circumferential direction, extends by a bayonet rotation angle range further than the valve inlet opening. This has the advantage of avoiding a situation in which the sealing ring is rotated past the inlet duct outflow of the water inlet duct during the bayonet rotation movement, which rules out any danger of the sealing ring being damaged on a sharp edge of the inlet duct outflow of the water inlet duct. The sealing ring completely surrounds the mouth region of the inlet duct outflow during the entire bayonet rotation movement, without traversing or crossing the edge of the mouth.

In an illustrative development of the invention, the receiving sleeve has a sleeve shape that is open across a free angle on the peripheral side, and the valve cartridge has on the peripheral side a radially protruding alignment flange, which extends across a circumferential angle corresponding to the free angle and comes to lie axially outside the receiving sleeve, i.e. behind same, i.e. extends axially beyond it, when the valve cartridge is axially completely inserted. This achieves a positioning, oriented in the rotation direction, for the valve cartridge that is to be inserted into the receiving sleeve. The valve cartridge can be pushed axially into the receiving sleeve only in that rotation position in which the alignment flange of the valve cartridge is located in the circumferential portion of the receiving sleeve free from the open sleeve shape. It is only when the valve cartridge is pushed axially completely into the receiving sleeve that the alignment flange of the valve cartridge passes axially beyond the receiving sleeve, such that the valve cartridge can be turned, for example in order to permit the stated bayonet rotation movement, when the fastening unit has the bayonet connection unit.

In an illustrative development of the invention, the receiving sleeve has, on the inner circumference, and the valve cartridge has, on the outer circumference, corresponding cone surfaces tapering in the cartridge insertion direction. This contributes to a precise axial fastening of the valve cartridge in the receiving sleeve and to a high degree of mechanical strength of the fastening of the valve cartridge in the receiving sleeve. Moreover, in the configuration with the sealing ring surrounding the valve inlet opening in an annular manner, these cone surfaces have the effect that, during the axial insertion of the valve cartridge into the receiving sleeve, the axially leading ring portion of the sealing ring is able to move axially past the edge of the inlet duct outflow of the water inlet duct without already bearing against same, such that any danger of the sealing ring being damaged by the edge of the inlet duct outflow of the water inlet duct is once again avoided. For this purpose, the cone surfaces then extend at least also in the region of the sealing ring or the inlet duct outflow of the water inlet duct.

In an illustrative development of the invention, the valve cartridge has, on its second end face, a turning-tool receptacle, i.e. a receptacle for a tool with which the valve cartridge can be turned. This is advantageous for example for the configuration in which the fastening unit has the bayonet connection unit. In this case, the valve cartridge, after axial insertion into the receiving sleeve, can be turned by said tool in order to effect the bayonet rotation movement and can thus be fastened securely and with a high degree of strength in the receiving sleeve. On its second end face, the valve cartridge is easily accessible for the tool, since this is the end face of the valve cartridge on which its pipe connection coupling is located, and therefore the purpose of attaching this pipe connection coupling already ensures easy accessibility to this end face of the valve cartridge.

In an illustrative development of the invention, the valve cartridge has, on the outer circumference, an axial cable guide for guiding at least one electrical connection cable from the first to the second end face. In this way, an electrical connection cable typically issuing from the electrical valve connection unit on the first end face can be routed to the second end face, which is advantageous particularly in cases where the second end face of the valve cartridge is more easily accessible than the first end face, when the valve cartridge is fastened in the receiving sleeve of the base body. The first end face of the valve cartridge does not necessarily have to remain accessible in this case.

In an illustrative development of the invention, the base body has a wall-mountable base plate and a socket body, which is secured to the base plate and which comprises the receiving sleeve, a water inlet, and the water inlet duct leading from the water inlet to the inlet duct outflow. This constitutes a multi-part configuration of the base body that is advantageous from the point of view of manufacturing technology and assembly. The base body can be mounted on a desired wall surface via the base plate, and the socket body can for its part be secured, e.g. releasably, on the base plate, wherein the receiving sleeve, the water inlet and the water inlet duct are prefabricated on the socket body.

In an illustrative development of the invention, the water inlet duct is oriented with a longitudinal direction of its water inlet perpendicular to a longitudinal direction of the receiving sleeve. This is expedient, for example, for conduit connection devices in which a building-side water installation connection terminates with an end connection piece oriented wall-parallel to its longitudinal axis and a pipe issuing perpendicularly from the wall surface is intended to be connected to the conduit connection device, i.e. more specifically to the pipe connection coupling of the valve cartridge. Moreover, in this embodiment, the base body can be realized with a relatively small installation depth, i.e. a small extent in the direction of the wall depth perpendicular to the wall surface.

In an illustrative development of the invention, the base body has an empty-tube receptacle for an empty tube that can be used for receiving an electrical line. This permits a simple electrical cable feed for the electrically controllable valve.

In an illustrative development of the invention, the base body forms a connection box with a box housing cover. The box housing cover protects the interior of the base body, including the valve, and can also function as an optical covering. The connection box is suitable in particular as a concealed box for concealed-type configurations of the conduit connection device.

Additional features and advantages of the present invention will become apparent to those skilled in the art upon consideration of the following detailed description of the illustrative embodiments best exemplifying the best mode of carrying out the invention as presently perceived.

BRIEF DESCRIPTION OF THE DRAWINGS

Advantageous embodiments of the invention are illustrated in the drawings. These and further embodiments of the invention are described in greater detail below. In the drawings.

DETAILED DESCRIPTION OF THE DRAWINGS

Figure 1:
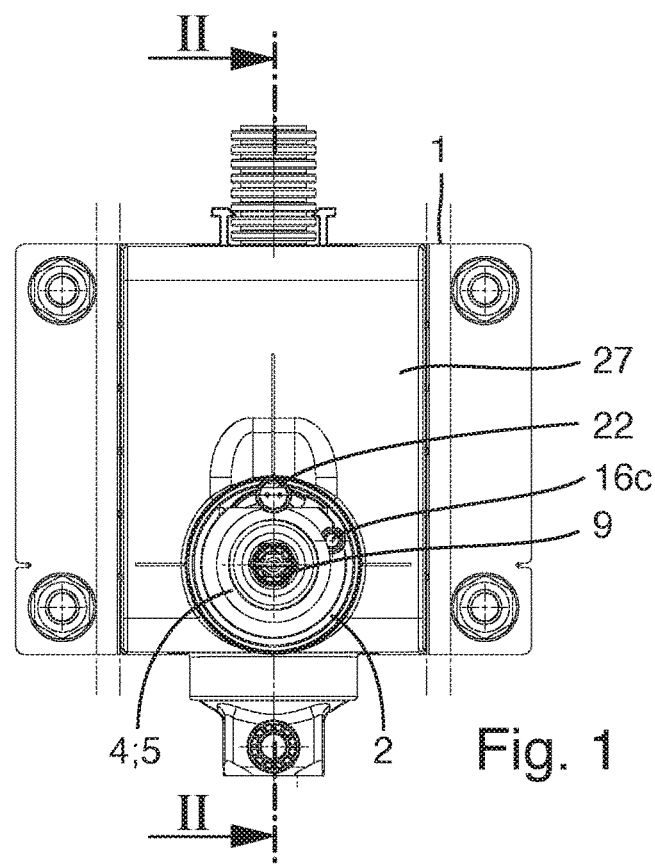
FIG. 1 shows a plan view of a wall-mountable sanitary conduit connection device.

The embodiments of the invention described herein are not intended to be exhaustive or to limit the invention to precise forms disclosed. Rather, the embodiments selected for description have been chosen to enable one skilled in the art to practice the invention.

The wall-mountable sanitary conduit connection device depicted in the figures comprises a wall-mountable base body 1 having a receiving sleeve 2 and a water inlet duct 3, and also an electrically controllable valve 4 having a cylindrical valve cartridge 5 which is axially insertable into the receiving sleeve 2, and a fastening unit 6 for fastening the valve cartridge 5 in a fixed position in the receiving sleeve 2. For mounting on a wall, the base body 1 has suitable fastening means. These are fastening screws 15 in the example shown, but it is alternative for this purpose to use other conventional wall-fastening means, which require no further explanation here.

The water inlet duct 3 leads with an inlet duct outflow 7 peripherally into the receiving sleeve 2. The valve cartridge 5 includes on the peripheral side, i.e. on its peripheral cylinder jacket surface, a valve inlet opening 8 which is capable of being coupled to the inlet duct outflow 7 of the water inlet duct 3 in a fluid-tight manner. This fluid-tight coupling is obtained when the valve cartridge 5 is fastened in a fixed position in the receiving sleeve 2 by means of the fastening unit 6, i.e. when the valve cartridge 5 is located in its position of use in the receiving sleeve 2.

Figure 2:
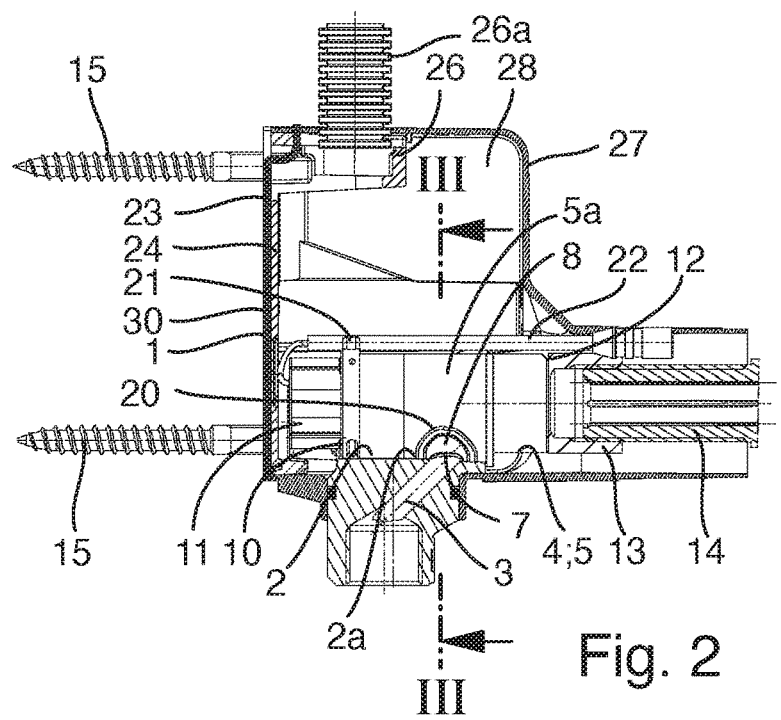
FIG. 2 shows a sectional view along a line II-II in FIG. 1.
Figure 3:
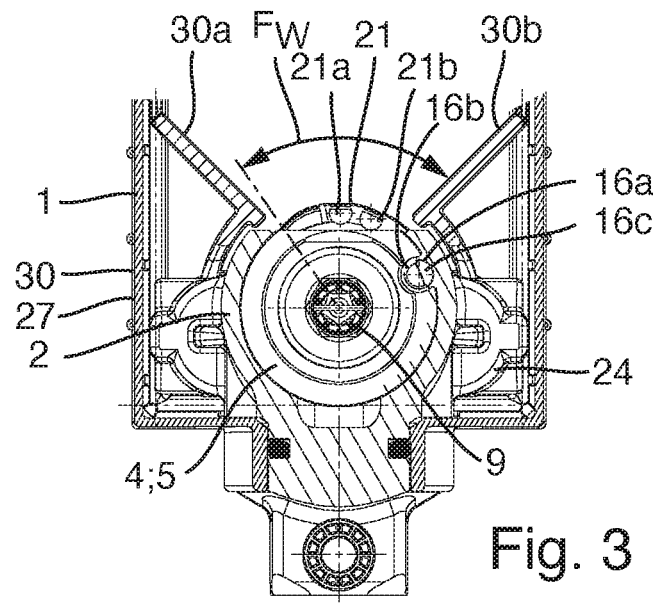
FIG. 3 shows a sectional view along a line in FIG. 2.
Figure 4:
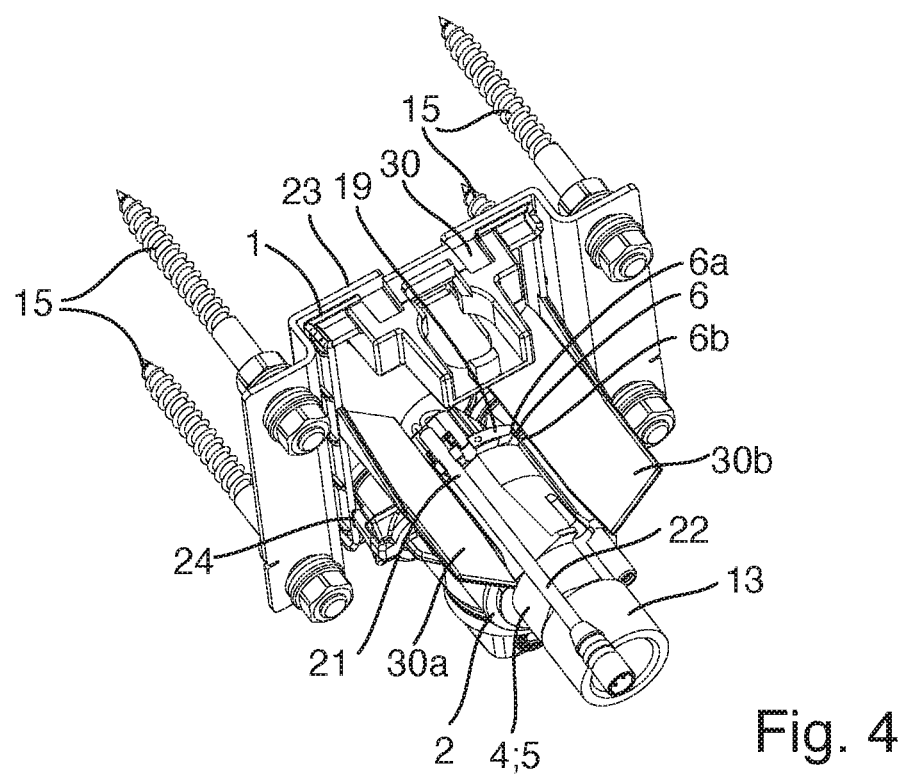
FIG. 4 shows a perspective view of the conduit connection device from FIGS. 1 to 3 with the housing cover removed, in a valve installation situation before a bayonet rotation of a valve cartridge pushed into a receiving sleeve.
Figure 5:
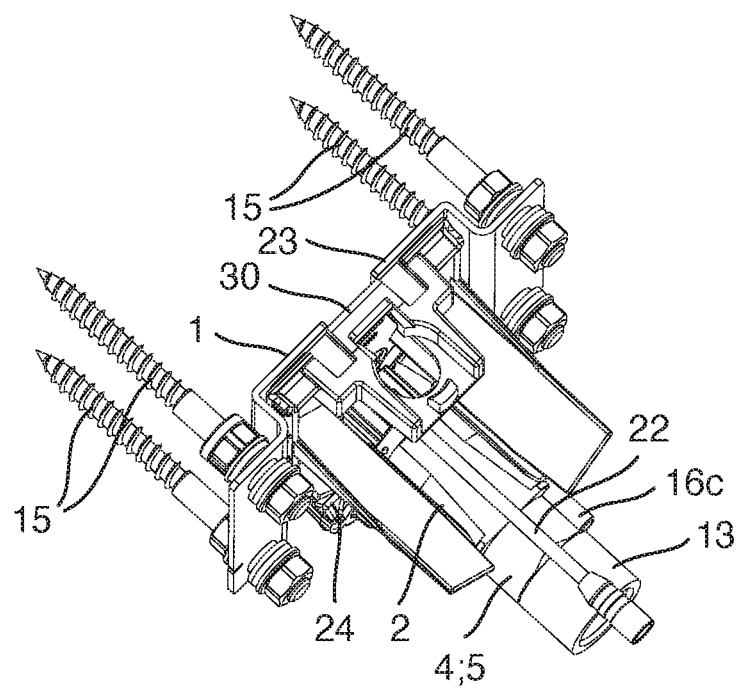
FIG. 5 shows a perspective view analogous to FIG. 4, in an installation situation with the valve cartridge already fixed.

Located in the valve cartridge 5 is a valve unit 9, e.g. of a conventional electrically controlled solenoid valve type and/or diaphragm valve type or any other desired conventional electrically controlled valve type, depending on requirements and on the particular use, which requires no further explanation here. On a first end face 10, the valve cartridge 5 has an electrical valve connection unit 11. On a second end face 12, the valve cartridge 5 has a pipe connection coupling 13. The pipe connection coupling 13 consequently forms an axial valve outlet of the valve 4 on the second end face 12 and can be realized, for example, by a connection internal thread into which a pipe 14 that is to be connected, as shown in FIG. 2, can be screwed, preferably with standardized mating dimensions such as ½ inch or ¾ inch thread couplings. Alternatively, a connection external thread or other types of connection coupling can be used for the pipe connection coupling 13, such as a bayonet connection coupling or a plug-in connection coupling. The valve is preferably configured as a shut-off valve, or it is alternatively of another valve type, e.g. a switching valve or mixing valve with suitably further valve inlets and/or valve outlets.

For mounting the valve 4, the latter is pushed with its valve cartridge 5, with the first end face 10 thereof axially to the front, into the receiving sleeve 2 of the base body 1 and is then fastened in a fixed position in the receiving sleeve 2 by means of the fastening unit 6. In corresponding embodiments, the fastening unit 6 for this purpose has, as in the example shown, a bayonet connection unit with a bayonet connection flange 6a protruding radially on the peripheral side of the valve cartridge 5 and with, on the receiving sleeve 2, a bayonet connection shoulder 6b engageable from behind by the bayonet connection flange 6a.

In this advantageous configuration, the valve cartridge 5, after being pushed axially into the receiving sleeve 2, is accordingly fastened in a fixed position in the receiving sleeve 2 by means of a customary bayonet rotation movement. Since the bayonet connection flange 6a of the valve cartridge 5 engages behind the bayonet connection shoulder 6b of the receiving sleeve 2 in this fastening position of the bayonet connection unit, the valve cartridge 5 is in particular fastened in a manner secure against axial removal from the receiving sleeve 2. In alternative embodiments, the fastening unit 6 is of another conventional connection type, e.g. using a screw connection or a snap-fit connection.

In an advantageous embodiment, the bayonet connection flange 6a and/or the bayonet connection shoulder 6b has a run-on bevel, in the example shown the bayonet connection flange 6a, as a result of which the valve cartridge 5, by means of the bayonet rotation movement, can be pressed or pulled axially to the fastened position in the receiving sleeve 2 on account of wedging forces that are generated by the run-on bevel.

In an advantageous embodiment, the receiving sleeve 2 has, on its inner circumference, and the valve cartridge 5 has, on its outer circumference, corresponding cone surfaces 2a, 5a tapering in the cartridge insertion direction, preferably through corresponding truncated cone surfaces in a respectively associated axial portion of the receiving sleeve 2 or of the valve cartridge 5, as in the example shown. This configuration can be readily combined with the aforementioned embodiment of the fastening unit 6 as a bayonet connection unit. By means of the bayonet rotation movement, the valve cartridge 5, as mentioned above, can additionally be pressed axially in the pushing-in direction relative to the receiving sleeve 2 and against the latter, as a result of which the valve cartridge 5 comes to bear with its outer cone surface 5a against the corresponding cone surface 2a on the inner face of the receiving sleeve 2. This results in a very firm, stable hold of the valve cartridge 5 in the receiving sleeve 2.

A limit stop of the bayonet rotation movement is optionally provided for the fastening unit 6 in the configuration of the latter as a bayonet connection unit, e.g. by the bayonet connection flange 6a of the valve cartridge 5 coming to bear, with a front edge in the bayonet rotation direction, against a corresponding limit shoulder on the receiving sleeve 2.

In advantageous embodiments, the fastening unit 6, in its configuration as a bayonet connection unit as in the example shown, has a bayonet lock which secures against inadvertent turning back of the bayonet rotation to the fastening position and thus against inadvertent release or loosening of the valve cartridge 5 fastened in a fixed position in the receiving sleeve 2. For this purpose, the bayonet lock has an axial partial peripheral bore 16a on the inner circumference of the receiving sleeve 2 and a corresponding axial partial peripheral bore 16b on the outer circumference of the valve cartridge 5, and also an anti-rotation bolt 16c. The two partial peripheral bores 16a, 16b are aligned only in the fastening position of the bayonet connection unit in order to form a full bore, into which the anti-rotation bolt 16c is then insertable.

This situation with the valve cartridge 5 already mounted in the receiving sleeve 2, and with the bayonet connection locked by means of the inserted anti-rotation bolt 16c, is shown in and clear from, for example, FIGS. 1 to 3, 5 and 6, while the situation with the valve cartridge 5 pushed into the receiving sleeve 2 before the final bayonet rotation is illustrated in FIGS. 4 and 10 to 12. It will be seen in particular from FIG. 12 that in this situation the two partial peripheral bores 16a, 16b are still offset in the rotation direction and are therefore not aligned in order to form the full bore. It is only when the valve cartridge 5 is rotated from this position to the final fastening position by the bayonet rotation movement that the two partial peripheral bores 16a, 16b align and thus form the full bore, into which the anti-rotation bolt 16c can then be inserted. When the anti-rotation bolt 16c is inserted into the full bore, it prevents the partial peripheral bore 16b of the valve cartridge 5 from rotating away from the partial peripheral bore 16a of the receiving sleeve 2 and thus locks the valve cartridge 5 against turning back to the bayonet release position.

In an advantageous configuration, the two partial peripheral bores 16a, 16b are designed as partial peripheral threads which, in their aligned position, provide a corresponding full thread, into which the anti-rotation bolt 16c, then configured suitably as a screw bolt, can be screwed. For example, the two partial peripheral bores 16a, 16b can each be designed as half-circumference threads which extend by 180° in the circumferential direction and which, in the aligned position, complement each other to form the full thread. In a further advantageous configuration as in the example shown, one of the two partial peripheral bores 16a, 16b of the valve cartridge 5, e.g. as shown the partial peripheral bore 16b, is designed as a partial peripheral thread which extends by more than 180°, while the other partial peripheral bore has no thread. In this case too, the anti-rotation bolt 16c is designed correspondingly as a screw bolt which can be screwed into the full bore when the two partial peripheral bores 16a, 16b are located in their aligned position. Here, the anti-rotation bolt 16c is guided in the thread of the relevant partial peripheral bore which, for this purpose, extends with its thread by slightly more than 180° in the circumferential direction, while the partial peripheral bore not provided with the thread merely provides the necessary remaining space for the anti-rotation bolt 16c and accordingly extends by slightly less than 180° in the circumferential direction. In this embodiment, therefore, only one of the two partial peripheral bores 16a, 16b needs to be manufactured with a thread.

In order to remove the valve cartridge 5, the anti-rotation bolt 16c is first of all withdrawn from the full bore, e.g. unscrewed, after which the valve cartridge 5 can be turned back to the bayonet release position and can then be withdrawn axially from the receiving sleeve 2.

Figure 9:
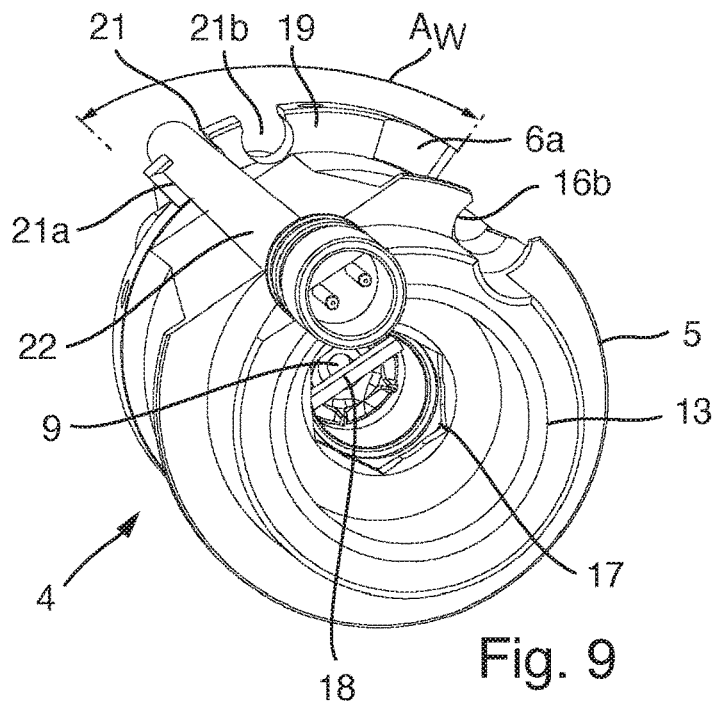
FIG. 9 shows a perspective plan view of the valve cartridge from above.
Figure 10:
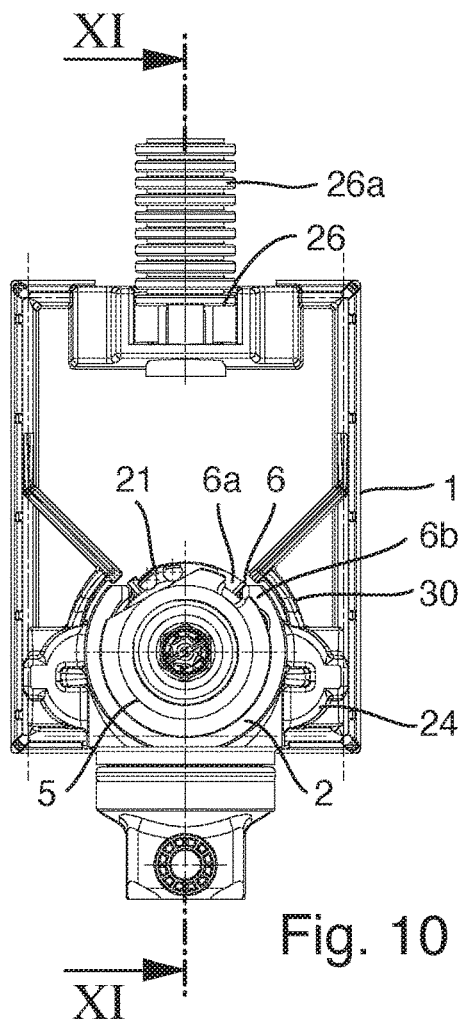
FIG. 10 shows a plan view of the conduit connection device without housing cover and base plate, in the installation situation before bayonet rotation.
Figure 11:
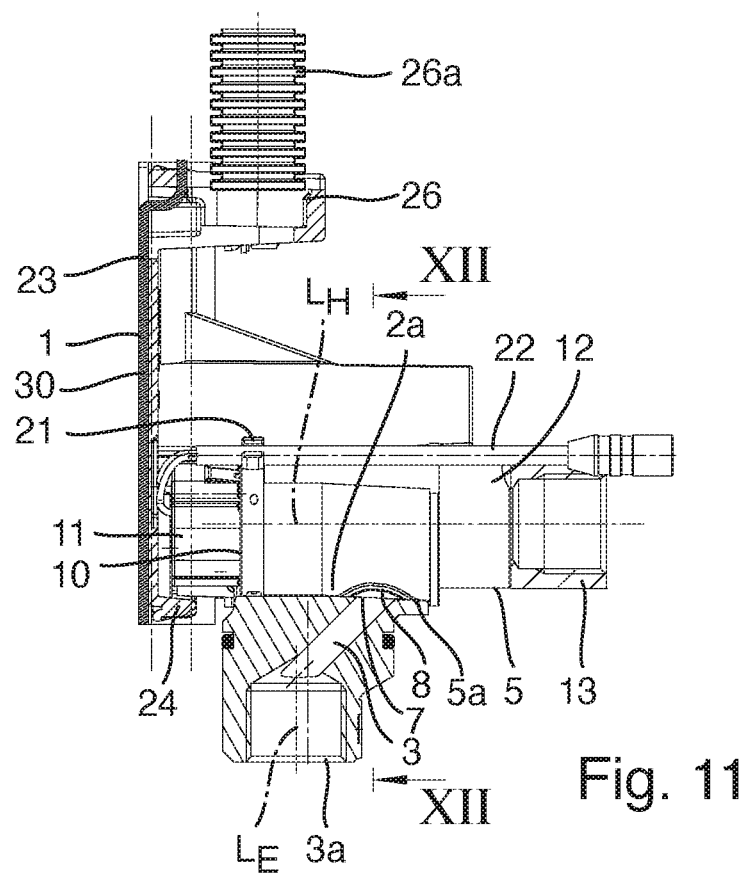
FIG. 11 shows a sectional view along a line XI-XI in FIG. 10.

In advantageous embodiments, the valve cartridge 5, as in the example shown, has a turning-tool receptacle 17 on its second end face 12, as can be seen in FIG. 9. A matching tool can be inserted into this receptacle 17, with which tool the valve cartridge 5 can be turned, in particular for the bayonet rotation movement for turning the valve cartridge 5 to its final fastening position and for turning it back to its bayonet release position. The turning-tool receptacle 17 can be configured, for example as shown, as a polygonal receptacle, in particular a hexagonal receptacle, or alternatively as another conventional turning-tool receptacle, e.g. of the cross-recessed type or of the simple longitudinal slot type, for the attachment of a corresponding screwdriver. Optionally, as in the example shown, the inner valve unit 9 is protected by an axial tool stop 18 against the tool being moved axially too far forward, said tool stop 18 being located at the axially rear end of the turning-tool receptacle 17, as can likewise be seen in FIG. 9. The tool stop 18 can be formed, for example, by a simple central web or transverse web which crosses the turning-tool receptacle 17 at the inner end thereof facing toward the valve unit 9.

In corresponding illustrative embodiments, as in the example shown, the receiving sleeve 2 has a sleeve shape that is open across a free angle FW on the peripheral side, i.e. it extends in the circumferential direction by a circumferential angle that is smaller, by the free angle FW, than 360° but preferably greater than 180°. Corresponding to this, the valve cartridge 5 has on the peripheral side a radially protruding alignment flange 19 which extends across a circumferential angle AW corresponding to the free angle FW and which reaches behind the receiving sleeve 2, i.e. axially beyond the latter, when the valve cartridge 5 is axially completely inserted, such that it does not then impede a rotation of the valve cartridge 5 in the receiving sleeve 2. However, the alignment flange 19 blocks a rotation of the valve cartridge 5 in the receiving sleeve 2 for as long as the valve cartridge 5 has not been completely pushed axially into the receiving sleeve 2, and the alignment flange 19 moreover has the effect that the valve cartridge 5 can be pushed axially into the receiving sleeve 2 only when in a very defined rotation position relative to the receiving sleeve 2. This is the rotation position in which the alignment flange 19 is aligned with the open circumferential portion of the receiving sleeve 2, for which purpose the open circumferential portion of the receiving sleeve 2 extends in the circumferential direction across the same angle, specifically the free angle FW, as the alignment flange 19, which extends across the corresponding circumferential angle AW. In corresponding embodiments, the bayonet connection flange 6a, as in the example shown, is part of the alignment flange 19, or it is alternatively arranged separate from the latter.

In advantageous embodiments, the valve cartridge 5, as in the example shown, has a sealing ring 20 which annularly surrounds the valve inlet opening 8 and which, in the cartridge circumferential direction, extends by a bayonet rotation angle range DW further than the valve inlet opening 8. It is thus possible to avoid a situation in which the sealing ring 20 comes into contact with the edge of the inlet duct outflow 7 or moves along said edge, when the valve cartridge 5 is rotated in the receiving sleeve 2 by the bayonet rotation movement.

Figure 12:
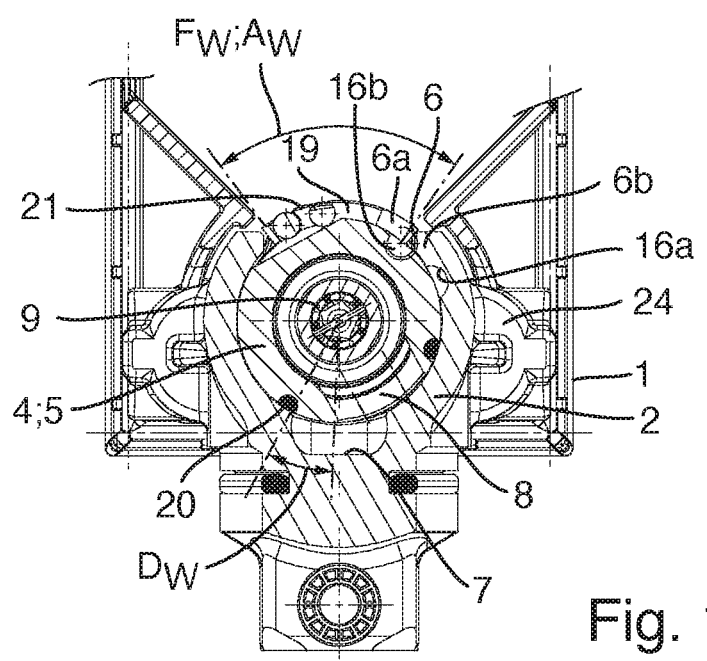
FIG. 12 shows a sectional view along a line XII-XII in FIG. 11.

As can be seen from FIG. 12 for example, the sealing ring 20 already lies completely outside the inlet duct outflow 7 during the axial insertion of the valve cartridge 5 into the receiving sleeve 2 in the intended rotation position of the valve cartridge 5, and it also remains outside the inlet duct outflow 7, and the boundary thereof, throughout the entire bayonet rotation movement. For this purpose, it extends in the direction of rotation beyond the valve inlet opening 8 by the bayonet rotation angle range DW, which valve inlet opening 8 lies offset in relation to the inlet duct outflow 7 before the bayonet rotation movement by the bayonet rotation angle and is brought into fluid-conducting alignment with the inlet duct outflow 7 by the bayonet rotation movement. Any sharp edges at the boundary of the inlet duct outflow 7 cannot therefore lead to damage of the sealing ring 20 when mounting the valve cartridge 5 in the receiving sleeve 2.

Moreover, in advantageous embodiments, the sealing ring 20 and the inlet duct outflow 7 are located, as in the example shown, in the region of the respective cone surface 5a, 2a. In this way, during the axial insertion of the valve cartridge 5 into the receiving sleeve 2, the sealing ring 20 can, with its axially front portion, move axially past the inlet duct outflow 7, without coming into contact with or being pressed against the boundary edge of the latter. This prevents any damage to the sealing ring 20.

In advantageous embodiments, as in the example shown, the valve cartridge 5 has, on the outer circumference, an axial cable guide 21 for guiding at least one electrical connection cable 22 from the first end face 10 to the second end face 12 of the valve cartridge 5. The first end face 10 of the valve cartridge 5 does not therefore need to remain accessible for electrical connection purposes when the valve cartridge 5 is inserted into the receiving sleeve 2. As is shown, the cable guide 21 can have, for example, a cable clamp holder of a conventional type, which is formed on the outer circumference of the valve cartridge 5. In the example shown, the cable guide 21 or the clamp holder is configured as part of the alignment flange 19. In alternative embodiments, it is realized independently of the presence of the alignment flange 19.

In the example shown, the cable guide 21 has, for example, two clamp holder units 21a, 21b as part of the alignment flange 19, wherein the one clamp holder unit 21a holds the depicted connection cable 22 issuing from the electrical valve connection unit 11 on the first end face 10 of the valve cartridge 5, while the other clamp holder unit 21b serves for holding an electrical cable routed externally to the conduit connection device, which electrical cable can then be electrically connected to, e.g. plugged into, the depicted connection cable 22 of the valve 4 in the easily accessible region on the second end face 12 of the valve cartridge 5.

Figure 6:
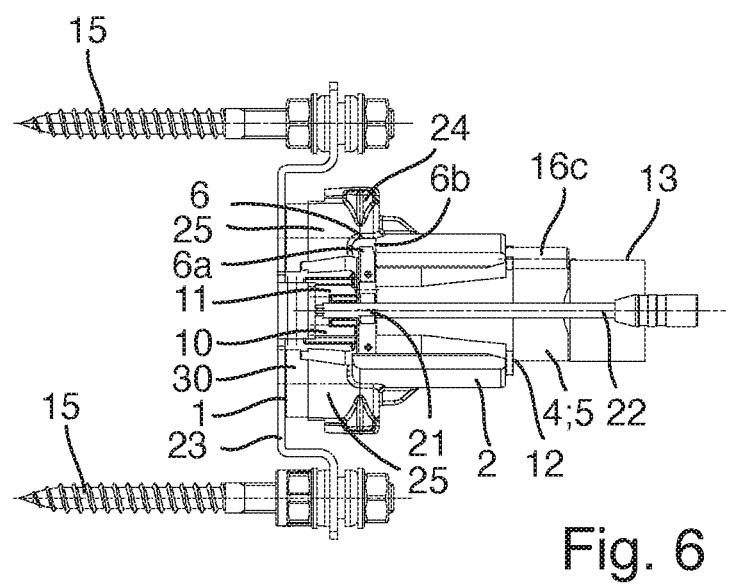
FIG. 6 shows a side view of a base plate and of a socket body of a base body of the conduit connection device from FIGS. 1 to 5, with the valve cartridge already mounted.
Figure 7:
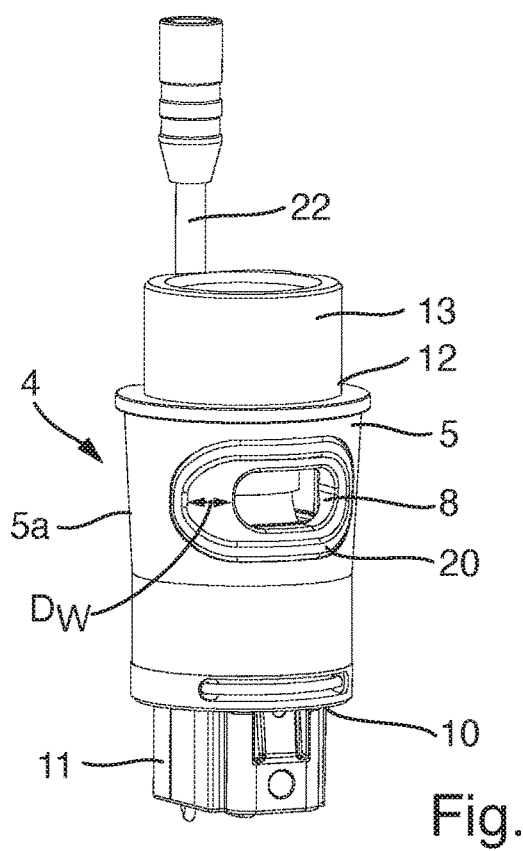
FIG. 7 shows a perspective side view of the valve cartridge in the region of its valve inlet opening.
Figure 8:
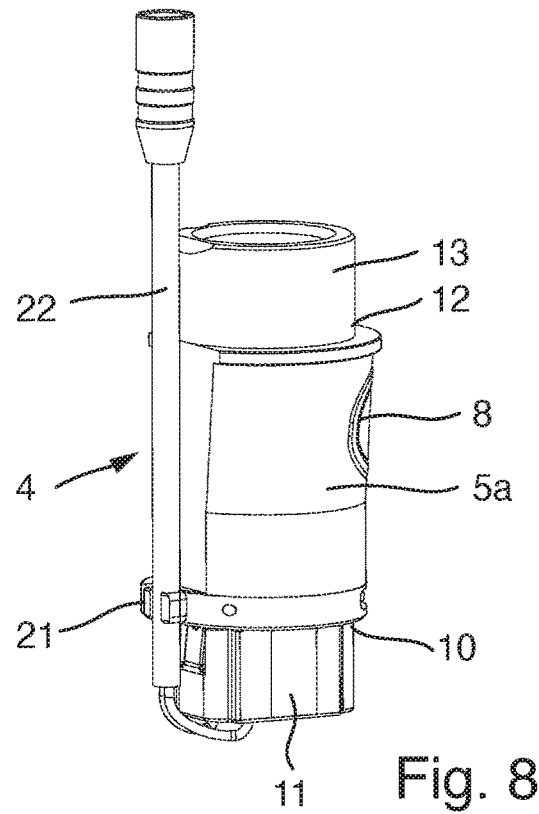
FIG. 8 shows a perspective side view of the valve cartridge, rotated in relation to FIG. 7.

In corresponding illustrative embodiments, the base body 1 has a wall-mountable base plate 23 and a socket body 24, which is secured to the base plate 23 and which has the receiving sleeve 2, a water inlet 3a, and the water inlet duct 3 leading from the water inlet 3a to the inlet duct outflow 7. The socket body 24 can be screwed onto the base plate 23, for example, as is represented in FIG. 6 by associated screw connection lines 25.

In corresponding illustrative embodiments, a longitudinal direction LE of the water inlet 3 is oriented perpendicularly with respect to a longitudinal direction LH of the receiving sleeve 2, as in the example shown. In the exemplary embodiment shown, the longitudinal direction LH of the receiving sleeve 2, and therefore also of the valve cartridge 5 fastened in a fixed position therein, is for its part oriented perpendicularly with respect to the base plate 23, while the water inlet longitudinal direction LE is oriented parallel thereto.

In corresponding illustrative embodiments, the base body 1 has, as in the example shown, an empty-tube receptacle 26 for an empty tube 26a, which serves for the routing of one or more electrical lines, for example a line for the electrical coupling of the valve 4 via the connection cable 22 thereof.

In corresponding illustrative embodiments, the base body 1, as in the example shown, forms a connection box with a box housing cover 27. The box housing cover 27 preferably has a cutout through which the valve cartridge 5 remains accessible at its second end face 12 and consequently with its pipe connection coupling 13 there, such that a pipe, e.g. the pipe 14, can be coupled to the valve cartridge 5 and uncoupled from it again, without the box housing cover 27 necessarily having to be removed for this purpose from the rest of the base body, e.g. the base plate 23 with the socket body 24 secured thereon.

A cavity 28 of the base body 1 can be seen in FIG. 2 for example, which cavity 28 is covered by the box housing cover 27 and can be used, for example, as stowage space or for accommodating electrical cables (not shown) and/or conventional electrical or electronic components of the sanitary conduit connection device, such as sensors, Bluetooth modules, etc., depending on requirements.

A sealing body 30 can optionally be used which ensures that the base body 1 is fluid-tight and which can at the same time provide integrated acoustic decoupling. The sealing body 30 can for this purpose extend with corresponding portions as a planar divide between the base plate 23 and the socket body 24 and/or can be a flat plate covering the base plate and/or can surround the receiving sleeve 2 and/or as shown, with two side wings 30, 30b, can separate the space in front of the open circumferential portion of the receiving sleeve 2 from the space behind it.

As the exemplary embodiments shown and explained above make clear, the invention very advantageously makes available a wall-mountable sanitary conduit connection device which has great flexibility in use, can be of a compact construction if so required, can be manufactured with relatively low outlay and can be used in modern sanitary systems including systems with water plugs and smart home systems.

Although the invention has been described in detailed with reference to preferred embodiments, variations and modifications exist within the spirit and scope of the invention as described and defined in the following claims.

The invention claimed is:

1. A wall-mountable sanitary conduit connection device, comprising:
    a wall-mountable base body having a receiving sleeve and a water inlet duct which, with an inlet duct outflow, leads through a periphery of the receiving sleeve into the receiving sleeve;

an electrically controllable valve having a cylindrical valve cartridge which is axially insertable into the receiving sleeve and in which a valve unit is located, which valve cartridge has an electrical valve connection unit on a first end face and a pipe connection coupling on a second end face and includes, on a peripheral side of the cylindrical valve cartridge and axially positioned between the first end face and the second end face, a valve inlet opening which is capable of being coupled to the inlet duct outflow in a fluid-tight manner; and a fastening unit for fastening the valve cartridge in a fixed position in the receiving sleeve.

2. The wall-mountable sanitary conduit connection device according to claim 1, wherein the fastening unit has a bayonet connection unit with a bayonet connection flange protruding radially on the peripheral side of the valve cartridge and with, on the receiving sleeve, a bayonet connection shoulder engageable from behind by the bayonet connection flange.

3. The wall-mountable sanitary conduit connection device according to claim 2, wherein the fastening unit has a bayonet lock with an axial partial peripheral bore on each of an inner circumference of the receiving sleeve and an outer circumference of the valve cartridge, and with an anti-rotation bolt, wherein the respective partial peripheral bores are aligned in a fastening position of the bayonet connection unit in order to form a full bore, into which the anti-rotation bolt is insertable.

4. The wall-mountable sanitary conduit connection device according to claim 2, wherein the valve cartridge has a sealing ring which annularly surrounds the valve inlet opening and which, in a cartridge circumferential direction, extends by a bayonet rotation angle range further than the valve inlet opening.

5. The wall-mountable sanitary conduit connection device according to claim 1, wherein the receiving sleeve has a sleeve shape that is open on the peripheral side across a free angle, and the valve cartridge has on the peripheral side a radially protruding alignment flange which extends across a circumferential angle corresponding to the free angle and which comes to lie axially outside the receiving sleeve when the valve cartridge is axially completely inserted.

6. The wall-mountable sanitary conduit connection device according to claim 1, wherein the receiving sleeve has, on an inner circumference, and the valve cartridge has, on an outer circumference, corresponding cone surfaces tapering in a cartridge insertion direction.

7. The wall-mountable sanitary conduit connection device according to claim 1, wherein the valve cartridge has, on the second end face, a turning-tool receptacle.

8. The wall-mountable sanitary conduit connection device according to claim 1, wherein the valve cartridge has, on an outer circumference, an axial cable guide for guiding at least one electrical connection cable from the first to the second end face.

9. The wall-mountable sanitary conduit connection device according to claim 1, wherein the base body has a wall-mountable base plate and a socket body, which is secured to the base plate and which has the receiving sleeve, a water inlet, and the water inlet duct leading from the water inlet to the inlet duct outflow.

10. The wall-mountable sanitary conduit connection device according to claim 1, wherein a longitudinal direction of a water inlet of the water inlet duct is oriented perpendicularly with respect to a longitudinal direction of the receiving sleeve.

11. The wall-mountable sanitary conduit connection device according to claim 1, wherein the base body has an empty-tube receptacle for an empty tube for an electrical line.

12. The wall-mountable sanitary conduit connection device according to claim 1, wherein the base body forms a connection box with a box housing cover.

\* \* \* \* \*